Nov. 6, 1934.  W. F. COTTER ET AL  1,979,314
POWER LINE REACTOR
Filed March 23, 1933
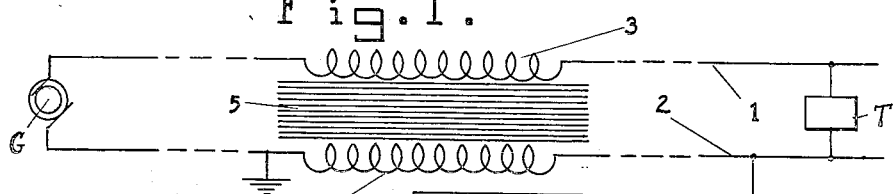
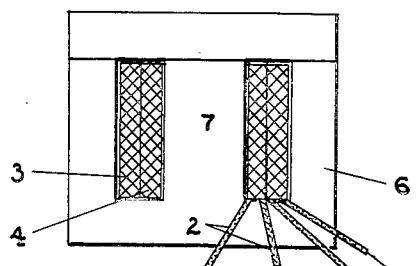
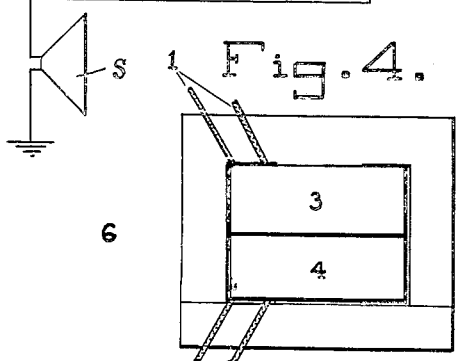
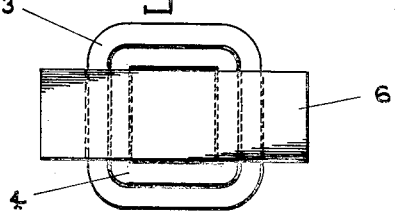
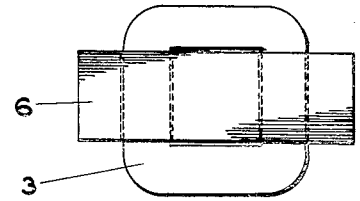
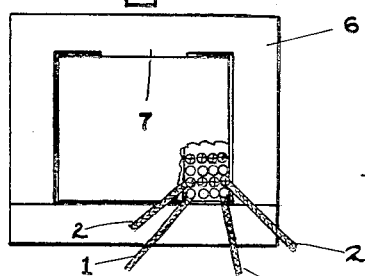
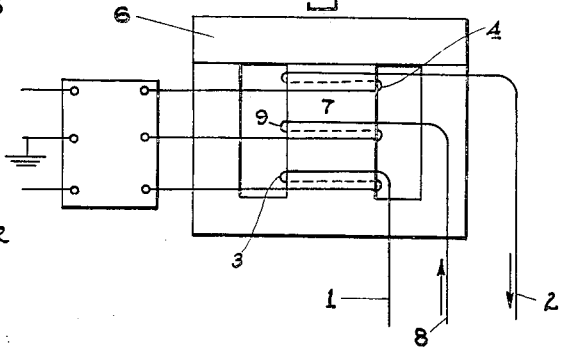
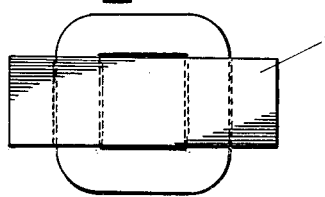
INVENTORS
William F. Cotter
& Marion E. Bond
BY
ATTORNEY.

Patented Nov. 6, 1934

1,979,314

UNITED STATES PATENT OFFICE 1,979,314

POWER LINE REACTOR

William F. Cotter and Marion E. Bond, Springfield, Mass., assignors to United American Bosch Corporation, Springfield, Mass., a corporation of New York Application March 23, 1933, Serial No. 662,253

4 Claims. (Cl. 171—97)

Our invention relates to improvements in electrical reactor coils, and particularly reactor coils for use upon light and power lines.

An object of the invention is to provide an electrical reactor which can be connected into the opposite sides of a light or power line and which is adapted to confine certain electrical phenomena to a desired portion of said line.

Another object of the invention is to provide an electrical reactor for use in connection with the reception of radio programs, and so designed that when a sufficient number of these reactors are inserted in the proper places a number of radio receivers and/or loud speakers may be connected to different parts of a power or light circuit and each operated independently of the others at the same time.

A further object of the invention is to provide an electrical reactor which will serve the purposes of the invention without in any way interfering with or obstructing the flow of energy through the circuit with which it is used.

The objects and advantages of the invention are fully set forth in the following description taken with the drawing, on which several embodiments of our invention are illustrated. But the disclosure is, of course, explanatory only and changes may be made herein without departing from the principle of the invention or exceeding the scope of the appended claims.

On the drawing:

Fig. 1 is a view showing how a reactor according to this invention can be connected into a light or power circuit;

Figs. 2 and 3 are respectively a side view partly in section and a top plan of one form of reactor;

Figs. 4 and 5 are similar views of another form;

Figs. 6 and 7 are similar views of a third modification; and

Fig. 8 illustrates how the same idea can be utilized in a three-wire circuit.

On the drawing the same numerals identify the same parts throughout.

On Fig. 1, we show a pair of line conductors 1 and 2 forming the opposite sides of a transmission circuit for lighting and other uses. This circuit may be the supply circuit of a house or other building. In the line of the conductor 1, we insert a coil 3, and in the line of the conductor 2 is a coil 4. These coils will be inductively coupled and provided with a magnetic core 5. The circuit containing the conductors 1 and 2 will be an alternating current circuit and the coils 3 and 4 will be so wound that the magnetic effect of one opposes the magnetic effect of the other. The conductor 2 on the "low" side of the circuit will be grounded. The flow of electrical energy for lighting and power purposes from the generator G to the translating devices, such as lamps, motors and other appliances, indicated as a whole at T, will therefore not be obstructed or materially reduced by these coils; but if a loud speaker S is connected to one of the conductors at a point between the coil therein and translating devices T or on the other side of these devices, and radio signals are impressed upon the lead 2 at some point between the speaker S and the coil 4, the signal oscillations will be confined to this conductor to the right of the coils 3 and 4 and will not pass out over the line between the reactor and the generator G. Hence if other loud speakers be connected to branch circuits between the reactor coils 3 and 4 and the generator G, they will not be energized by any of the signal oscillations, because such oscillations will be prevented by the coils 3 and 4 from reaching them.

This reactor is an important part of the invention, made jointly by ourselves, for improvements in Program distribution system Serial No. 662,252, filed of even date herewith.

Figs. 2 and 3 show one method of constructing the reactor involving the coils 3 and 4. In this embodiment, the coil 3 is wound over the coil 4 and placed in a rectangular frame 6 where they envelop a transverse central core 7. In Figs. 4 and 5 the coils are placed in a similar frame with a similar core, but wound side by side, and are structurally separate from each other. In Figs. 6 and 7 the same kind of core and frame is used, but the conductors of the two coils are wound together and are disposed side by side throughout the entire extent of the two coils. This mode of winding is known as duplex winding.

Fig. 8 shows a three-wire circuit comprising conductors 1 and 2 and a neutral wire 8 which is grounded. Each of these conductors has a reactor coil therein, such coils being shown at 3, 4 and 9 respectively, all having a closed magnetic circuit in the form of a metallic frame 6 having a central core 7. These coils are so wound that the sum of the magnetic effects of the different coils at any moment is zero, so that, as before, the flow of the working current is not obstructed. This device is not a part of our invention but illustrates the same principle.

With this construction, a radio program can be impressed upon the wires of a building and the speaker S can be connected to the wires at any point on the same side of the reactors as the devices T. The program will therefore be confined by the reactors 3 and 4 to the section of the line containing the devices T, and if a similar branch circuit be connected to the conductors 1 and 2, between the reactors 3 and 4 and the generator G, none of the signal oscillations will be able to pass out to this branch circuit. Hence if someone else desires to use such branch circuit for radio reception by connecting a receiver and a speaker thereto, the two speakers will not interfere with each other.

In practice the resistance of these reactor coils will be about .05 ohms and the inductance will be of the order of 50 millihenries measured at 60 cycles per second. The total impedance of the lines to ground circuit will therefore be about 20 ohms.

The principal advantage of the reactors is that they make the power or lighting line available at low impedance for signalling purposes and do not obstruct materially the flow of power or lighting current. At most, these reactors introduce only a little extra ohmic resistance. In ordinary lighting circuits the conductors are often enclosed in a metallic sheath, and some capacity between conductors and this sheath always arises. If the impedance of the source of program current is high and the impedance of the reproducer circuit including the speaker is likewise high, then the potential between conductors and the sheath will be high and the loss through the capacity of the line is great. Otherwise, if the impedance of the program source and the reproducer circuits are both low, then the potential between the conductors and the sheath will be low and loss through the capacity will be greatly reduced. The reactors are designed so as to utilize the latter condition.

We have further found in practice that the use of these reactors introducing a common impedance in both sides of the line tends to prevent flow of power current from the line to the ground through the program circuits, and to cause current which may enter the "high" side of the power circuit to flow back through the "low" side of the line. This tendency results in a minimum amount of power current in the program circuits, as well as most efficient transmission of the signal oscillations to the speaker.

With our invention a radio receiver can be set up in the living room, for example, downstairs in a house, while any one of the occupants can connect a speaker to a lamp socket or similar outlet in the same or any other room, upstairs or down. It will be unnecessary for the loud speaker to be joined by a long conductor cord to the receiver; or even to move the loud speaker around from one room to another, because the owner may have several loud speakers in different rooms of his place of abode, if he so desires.

Having described the invention, what is claimed is:

1. In a system having conductors and a source of energy connected thereto, a reactor comprising windings in a plurality of said conductors, said conductors being connected to different points of said source of energy supplying said system, and one of said conductors being permanently grounded between said reactor and said source, said windings being in inductive relation to each other and wound to neutralize each other's magnetic effects, and a grounded translating device connected to the grounded conductor on the opposite side of said reactor.

2. In a system having conductors and a source of energy connected thereto, a pair of conductors, a reactor comprising a coil in each of said conductors, said coils being inductively related to each other and wound to neutralize each other's magnetic effects, said conductors being connected to different points of said source of energy supplying said system and one of said conductors being permanently grounded between said source and said reactor, and a grounded translating device connected to the grounded conductor on the opposite side of said reactor.

3. In a circuit having conductors and a source of energy connected thereto, a reactor comprising windings in a plurality of said conductors, said windings being inductively related to each other and wound to neutralize each other's magnetic effects and being designed to render the circuit available at low impedance to transmit working current therethrough, said conductors being connected to different points of said source of energy supplying said circuit and one of said conductors being permanently grounded between said source and said reactor, and a grounded translating device connected to the grounded conductor on the opposite side of said reactor.

4. In a system having conductors and a source of energy connected thereto, a reactor comprising windings in a plurality of said conductors, said reactor windings being inductively related to each other and wound to neutralize each other's magnetic effects, said windings being adapted to confine current to said conductors, one of said conductors being permanently grounded between said source and said reactor, and a grounded translating device connected to the grounded conductor on the opposite side of said reactor.

WILLIAM F. COTTER.
MARION E. BOND.